United States Patent

Ui

Patent Number: 5,922,221
Date of Patent: Jul. 13, 1999

[54] ELECTRIC DISCHARGE MACHINING METHOD AND ELECTRIC DISCHARGE MACHINING FLUID

[75] Inventor: Yoshiji Ui, Kanagawa, Japan

[73] Assignee: Sodick Co., Ltd., Japan

[21] Appl. No.: 08/718,570

[22] PCT Filed: Feb. 2, 1996

[86] PCT No.: PCT/JP96/00225

§ 371 Date: Nov. 25, 1996

§ 102(e) Date: Nov. 25, 1996

[51] Int. Cl.⁶ .................................................. B23H 1/08
[52] U.S. Cl. ................................ 219/69.14; 219/69.17; 252/572
[58] Field of Search .................. 219/69.14, 69.17, 219/69.12; 252/572, 573; 427/580

[56] References Cited

U.S. PATENT DOCUMENTS

| | | | |
|---|---|---|---|
| 4,251,706 | 2/1981 | Frei et al. | 219/69.14 |
| 4,362,989 | 12/1982 | Frei | 324/71 CP |
| 4,375,588 | 3/1983 | Frei | 219/69.17 |
| 4,392,042 | 7/1983 | Inoue | 219/69.12 |
| 4,870,243 | 9/1989 | Wilson et al. | 219/69.14 |
| 4,952,768 | 8/1990 | Mohri et al. | 219/69.15 |
| 5,315,087 | 5/1994 | Itoh | 219/69.12 |
| 5,434,380 | 7/1995 | Magara et al. | 219/69.14 |
| 5,539,173 | 7/1996 | Takahashi | 219/69.14 |
| 5,651,901 | 7/1997 | Mohri et al. | 219/69.17 |

FOREIGN PATENT DOCUMENTS

| | | |
|---|---|---|
| 0 596 660 | 5/1994 | European Pat. Off. . |
| 52-26357 | 7/1977 | Japan . |
| 55-27810 | 7/1980 | Japan . |
| 55-500783 | 10/1980 | Japan . |
| 57-107740 | 7/1982 | Japan . |
| 61-11281 | 4/1986 | Japan . |
| 62-239 | 1/1987 | Japan . |
| 62-24916 | 2/1987 | Japan . |
| 2-83119 | 3/1990 | Japan . |
| 3-277421 | 12/1991 | Japan . |
| 6-91430 | 4/1994 | Japan . |
| 787731 | 12/1957 | United Kingdom . |
| 828336 | 2/1960 | United Kingdom . |

OTHER PUBLICATIONS

Journal of the Japan Society of Electrical–machining Engineers, vol. vol. 25, No. 49, "Mori et al.", pp. 47–60 (1977).

*Primary Examiner*—Geoffrey S. Evans

[57] ABSTRACT

In order to form a mirror-finish surface on a workpiece (3), a machining fluid (921) obtained by blending a titanium carbide powder into an oil-based dielectric fluid which is supplied to a machining gap formed between the workpiece and a tool electrode (1, 2). The fine powder has an average particle size of about 0.5–1 $\mu$m, and is supplied to the dielectric fluid in a range of about 8–50 g/l. Alternatively, the electric discharge machining fluid includes a mixture of an oil-based dielectric with a silicide powder such as $TiSi_2$, $VSi_2$, $CrSi_2$, $ZrSi_2$, $TaSi_2$, $NbSi_2$, $MnSi_2$, $MoSi_2$, $FeSi_2$, $CoSi_2$, $WSi_2$, or $NiSi_2$. The silicide powder has an average particle size of about 0.5–15 $\mu$m, and is present in the dielectric fluid in a range of about 3–50 g/l.

21 Claims, 3 Drawing Sheets

ELECTRIC DISCHARGE MACHINING METHOD AND ELECTRIC DISCHARGE MACHINING FLUID

FIELD OF THE INVENTION

The present invention relates to an electric discharge machining method and electric discharge machining fluid. More specifically, the present invention relates to a method for machining a workpiece by effecting an electric discharge in a gap formed between a tool electrode and a (workpiece which forms another electrode) and to the machining fluid supplied to that gap.

BACKGROUND OF THE INVENTION

Electric discharge machining ("EDM") is a process for precisely manufacturing parts or molds (dies) by causing many electric discharges to occur at the gap while moving the tool electrode relative to a conductive workpiece. A continuous controlled power pulse is supplied to the gap in order to effect an electric discharge in the machining space or "gap" formed between the tool electrode and the workpiece (which forms another electrode).

In general, power pulses are generated in a power supply unit, which is unavoidably positioned at some physical distance from the machining unit, the latter including parts to support the workpiece and mechanical parts which cause the tool electrode to move relative to the workpiece. The power supply unit houses, typically within a cabinet, electric parts for generating the power pulse, as well as a controller which controls the size, polarity, ON and OFF time of the power pulse energy, and the relative movement between the tool electrode and workpiece. The power supply unit is connected to the machining unit by an appropriate lead line.

An electrode, shaped in the mirror image of the desired shape to be fabricated from the workpiece and made from a conductive material such as copper or graphite, is used as the tool electrode. Alternatively, a moving wire electrode made of a material such as brass may be used in order to cut out a desired profile from the workpiece. Machining using a moving wire electrode is analogous to mechanical machining with a fret or bead saw.

During machining, the workpiece is housed in a work tank, and the gap is filled with a dielectric fluid such as kerosene or high relative-resistance deionized water. When, by means of the application of power pulses to the gap, the voltage across the gap reaches a certain value, the dielectric fluid becomes ionized and a discharge occurs. As a result, a current flows through the gap, and a very small portion of the workpiece material evaporates or melts, whereupon it is washed away from the gap by the flow of dielectric fluid. In this manner, very small crater-like holes are formed on the surface of the workpiece. Insulation across the gap is restored by having the cessation of the power pulse application.

In general, after first performing rough machining under "low-wear" machining conditions, finish machining is performed in order to improve the quality of the workpiece surface by applying small energy power pulses to the gap. A technique is known whereby a dielectric fluid into which powdered metal or semi-metal material is supplied to the gap during the finish machining. A mixture of silicon powder having an average particle size of 20–40 $\mu$m and mixed in kerosene at a ratio of 20 g/l, is disclosed in Japanese Laid-Open Patent 2-83119. Japanese Laid-Open Patent 3-277421 discloses the use of silicone geranium, and aluminum powder having an average particle size of 5–10 $\mu$M.

An object of the present invention is to provide an electric discharge machining method for machining a workpiece with good dimensional accuracy and forming a pinhole-free surface thereon.

Another object of the present invention is to provide an electric discharge machining method to form a hard, mirror-finish surface on the workpiece.

Yet another object of the present invention is to provide an electric discharge machining fluid to the workpiece which will contribute to the forming of a pinhole-free mirror-finish surface.

Other objects of the present invention will in part be discussed in the explanation below, and will in part become clear to practitioners of the art through the implementation of the invention.

SUMMARY OF THE INVENTION

In order to achieve the above as well as others objects, of the invention an electric discharge machining method according to the invention is disclosed in which a workpiece is machined by means of electric discharges created in the machining gap formed between the workpiece and the tool electrode. The method includes a step in which titanium carbide (TiC) powder is blended into the dielectric fluid to form the electric discharge fluid, and a step in which the electric discharge fluid is supplied to the machining gap.

Preferably, the electric discharge machining method will include a step in which the positive pole of the power supply is connected to the workpiece, and the negative pole of the power supply is connected to the tool electrode to supply a power pulse from the power supply to the machining gap.

Furthermore, the electric discharge machining fluid according to the present invention may include a mixture of an oil-based dielectric fluid with titanium carbide (TiC).

The titanium carbide powder preferably has a 0.3–1.2 $\mu$m average particle sizes and is present in the range of 8–50 g/l in the dielectric fluid.

Furthermore, the electric discharge machining method according to the present invention, in which the workpiece is machined by electric discharges produced in the machining gap formed between the workpiece and the tool electrode, preferably includes a step of creating the electric discharge machining fluid by blending silicide powder into the dielectric fluid, and a step in which the electric discharge machining fluid is supplied to the machining gap.

Also, the electric discharge machining fluid of the present invention may preferably be formed by a mixture of oil-based dielectric fluid and silicide powders such as $TiSi_2$, $VSi_2$, $CrSi_2$, $ZrSi_2$, $TaSi_2$, $NbSi_2$, $MnSi_2$, $MoSi_2$, $FeSi_2$, $CoSi_2$, $WSi_2$, and $NiSi_2$.

Preferably silicide powders having an average particle size of 0.5–15 $\mu$m are used, and are present in the dielectric fluid in the range of about 3–50 g/l.

PRESENTLY PREFERRED EMBODIMENT OF THE INVENTION

Figure 1:
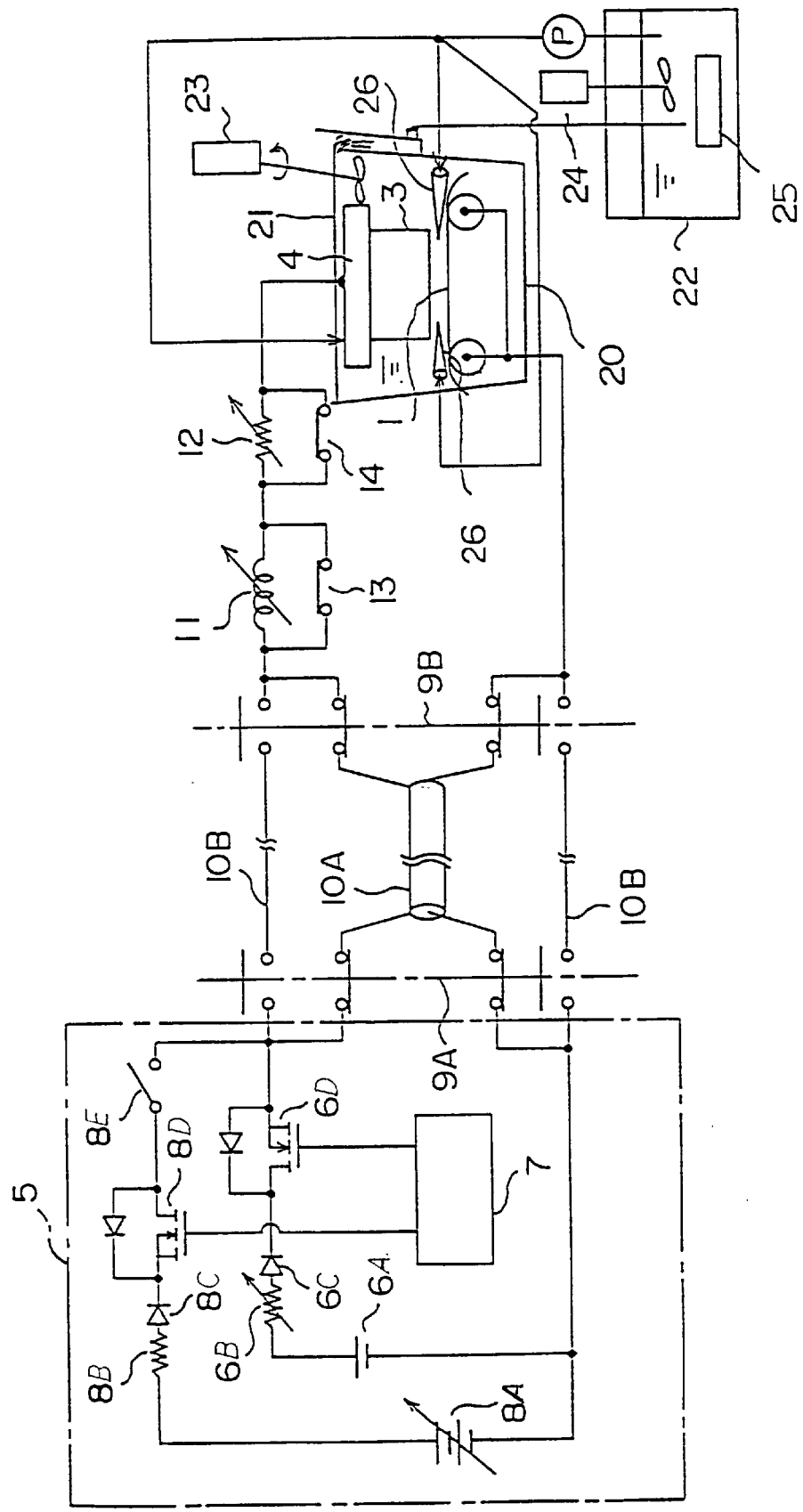
FIG. 1 illustrates a wire cut electric discharge machine for performing electric discharge machining in accordance with the present invention.

The wire cut electric discharge machine illustrated in FIG. 1 includes a moving wire electrode 1 stretched between a pair of guides 2A and 2B. The workpiece 3 is affixed to a support part 4 mounted on an XY cross table (not shown). The work piece 3 is positioned in close proximity to the wire 1. A work tank 20 houses the workpiece 3, and is filled with a machining fluid 21. In order to supply the machining fluid 21, which is obtained by adding titanium carbide (TiC) powder to an oil-based dielectric fluid, to the work tank 20, a reservoir tank 22 is provided in which the fluid expelled from the work tank 20 may be reconstituted. The titanium carbide powder used in accordance with the present invention preferably has a particle size of about 0.3–1.2 $\mu$m, and more preferably has a particle size of about 0.5–1.0 $\mu$m, and is mixed in the dielectric fluid at a ratio of about 8–50 g/l. During machining, the machining fluid 21 is supplied from the reservoir tank 22 through, for example a pair of nozzles 26 to the machining gap or space formed between the wire 1 and the workpiece 3. A mixer 23 may be used to mix the machining fluid 21 with which the work tank 20 is filled, and is provided in order to maintain the concentration of powder in the fluid at a fixed value. Similarly, a mixer 24 is provided in order to mix the machining fluid in the reservoir tank 22. A magnetic body 25 may be provided inside reservoir tank 22 to adsorb waste removed from the workpiece 3 by machining.

The wire cut electric discharge machine further includes a power supply unit, unavoidably positioned at some physical distance from the machining gap, for the purpose of applying power pulses through an appropriate cable to the machining gap. A power supply unit 5 typically houses, e.g. within a cabinet, electric parts for producing power pulses, as well as a controller for controlling energy size, polarity, and pulse on time and OFF time of the power pulse.

The typical power supply unit 5 includes a series combination made up of, for example, a 150V DC power supply 6A, a 100$\Omega$ variable resistor 6B, a diode 6C, and a switching device 6D such as a MOS-FET transistor. Furthermore, a series combination which is made up of, for example, a variable DC power supply 8A, adjustable between 100V and 350V, a 1 k$\Omega$ current limiting resistor 8B, a diode 8C, a switching element 8D, and a switch 8E may be provided. The two series combinations are connected in parallel to the wire electrode 1 and the workpiece 3, which forms the other electrode. A pulse controller 7 is typically provided in order to supply a pulse control signal having a certain ON time and OFF time to the switching elements 6D and 8D.

The power pulses from the power supply unit 5 are supplied to the machining unit having a machining gap through, for example, either a pair of low inductance lead lines 10A which form a coaxial cable, or a pair of low capacitance lead lines formed as separate strands. A switch 9A may be placed between the conductors and the power supply unit 5, and a switch 9B is placed between the conductors and the machining unit. Depending on the operation of the switches 9A and 9B, the low inductance lead line 10A is generally used for rough machining, and the low capacitance lead line 10B is used for finish machining.

Furthermore, in the embodiment of FIG. 1, a line coil 11, having, for example, an approximately 7–10 $\mu$H inductance, and the switch 13 are connected in parallel between the switch 9B and the machining gap. Additionally, a variable resistor 12 and a switch 14 are connected in parallel between the inductance coil 11 and the machining gap. The inductance coil 11 and the resistor 12 are provided in order to reduce undesirable effects on the surface of the workpiece 3 caused by current surges which flow through the gap at the instant when a discharge is generated across the gap. To accomplish that objective, the inductance coil 11 should have a range of from about 5 to several 10s of $\mu$H, and the resistor 21 should be in a range of about 20–100$\Omega$. Current surges occur due to stray capacitance between parts housed in the power supply unit 5 or between lead lines. During finish machining, in order to improve the surface of the workpiece 3, the inductance coil 11 and the resistor 12 are inserted into the power supply circuit by opening the switches 13 and 14. Preferably, the inductance coil 11 and the resistor 12 are positioned in the vicinity of the machining gap. For example, they can be housed in a small box and attached to a side wall of the tank 20.

An example of electric discharge machining performed in accordance with the present invention, using the wire cut electric discharge machine as illustrated in FIG. 1 will now be discussed.

Using a brass wire electrode having a 0.2 mm diameter, a workpiece made of 10.0 mm thick SKD-61 (JIS Standard) material was machined by electric discharge to cut a square profile. A titanium carbide (TiC) powder having an approximately 0.7 $\mu$m average particle size was added in a ratio of 12 g/l to a hydrocarbon oil with a viscosity of 1.885 cSt (40° C.) and ignition temperature of 100° C. After stirring in the reservoir tank 22, the machining fluid was supplied to the machining gap. The powder was manufactured by the well-known CNTD (Controlled Nucleation Thermochemical Deposition)-CVD method. Titanium carbide generally has a high hardness of 2900–3200 kg/mm$^2$, and is therefore brittle and easily pulverized.

Machining was performed to form a mirror-finish surface on a workpiece 3 which had been rough machined until the surface roughness reached 5.3 $\mu$m Rmax.

The electrical machining conditions for this finish machining are discussed below. The low capacitance lead line 10B was used in order to connect the power supply unit 5 and the machining unit through the operation of the switches 9A and 9B. "Straight polarity" was used, whereby the workpiece electrode 3 was connected to the power supply 6A and 8A positive poles, and the tool electrode 1 was connected to the negative poles. A four winding 250 mm diameter inductance coil 11, equivalent to 7–10 $\mu$H, was used. The switches 13 and 14 were opened. By turning on the switching element 8D power pulses were applied from the power supply 8A across the machining gap. When an electric discharge was detected, a power pulse was supplied to the gap from the power supply 6A by turning on the switching element 6D, while at the same time the switching element 8D was turned off. Following a certain ON time, the switching element 6D was turned off. Following a certain OFF time, i.e., after the switching element 6D was turned off, the switching element 8D was again turned on. Other electrical discharge machining settings were changed in the order of cuts (1), (2), (3), as shown in the table below:

TABLE 1

|  | (1) | (2) | (3) |
| --- | --- | --- | --- |
| Power Supply 6 | | | |
| Unloaded Voltage (V) | 150 | 150 | 150 |
| ON Time ($\mu$s) | 0.5 | 0.5 | 0.5 |

TABLE 1-continued

|  | (1) | (2) | (3) |
| --- | --- | --- | --- |
| OFF Time ($\mu$s) | 1.5 | 1.0 | 1.5 |
| Peak Current (A) | 2 | 1 | 1 |
| Power Supply 8 |  |  |  |
| Unloaded Voltage (V) | 150 | 150 | 150 |
| Peak Current (A) | 0.15 | 0.15 | 0.15 |
| Average Gap Voltage (V) | 115 | 125 | 130 |
| Average Gap Current (A) | 0.2 | 0.18 | 0.15 |
| Resistor 11 ($\Omega$) | 0 | 20 | 45 |

A mirror-finish surface was formed on the workpiece 3 after finish machining, and surface roughness was improved to 0.4 $\mu$m Rmax. Straightness was within 1 $\mu$m.

The applicant assayed titanium carbide powder of different particle sizes with the object of machining the workpiece at a favorable dimensional accuracy to form a mirror-finish surface thereon. When a powder of 1.2–8 $\mu$m was used, the wire electrode broke frequently during machining, producing undesirable burrs on the upper and lower surface edges of the workpiece.

Figure 2:
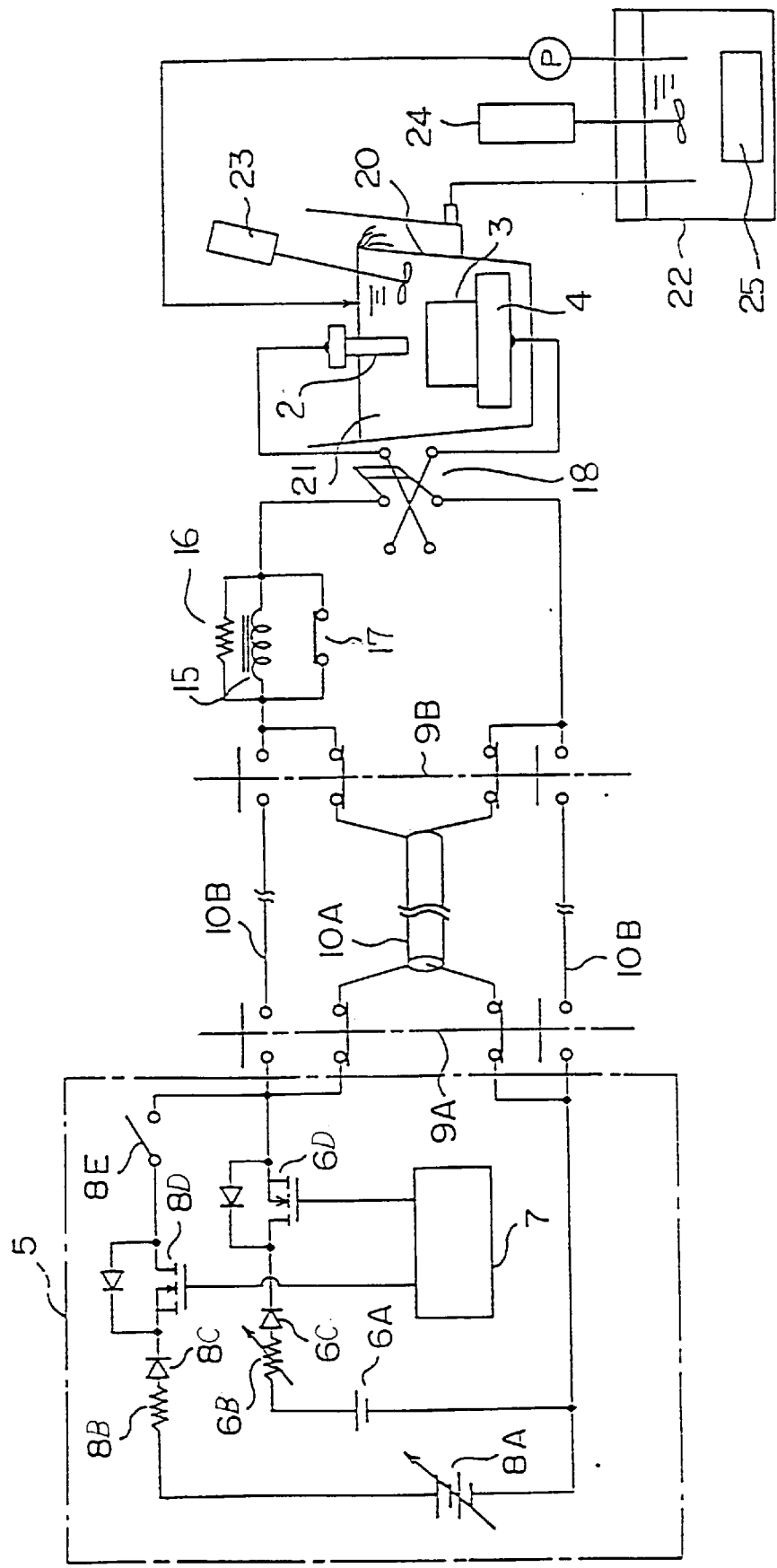
FIG. 2 illustrates a shape-forming electric discharge machine for performing electric discharge machining in accordance with the present invention.

Referring to FIG. 2, several experimental examples will now be discussed in which the shape-forming electric discharge machining embodiment of the present invention is used. Similar elements are given the same reference numerals as used in FIG. 1; explanation thereof is omitted.

The electric discharge machine illustrated in FIG. 2 includes a tool electrode 2 having a three-dimensional form. A polarity switching device 18 is provided in order to select either "reverse polarity," in which the tool electrode is connected to the positive pole of the power supply and the workpiece is connected to the negative pole,, or "straight polarity." Also, a choke coil 15, resistor 16, and switch 17 are connected in parallel between the switch 9B and the machining gap. The choke coil 15 and the resistor 16 contribute to the ability of a current, having a waveform with an extremely small current value with respect to sustain time, to flow across the machining gap.

Experimental results for electric discharge machining conducted according to the present invention, using the electric discharge machine illustrated in FIG. 2 will now be discussed.

A workpiece 3, composed of SKD-61 (JIS Standard) materials was machined by electric discharge machining using a 40 mm diameter rod—shaped copper electrode. A titanium carbide (TiC) powder having an average particle size of approximately 0.7 $\mu$m was added to a hydrocarbon oil having a viscosity of 1.885 cSt (40° C.) and ignition temperature of 100° C. to form a machining fluid. After stirring in the reservoir tank 22, the machining fluid was supplied to the machining gap. The powder was manufactured using the CNTD-CVD method.

Machining was performed to form a mirror-finish surface on the workpiece 3, which had been rough machined under "reverse polarity" conditions until the surface roughness reached 5 $\mu$m Rmax.

The electrical discharge machining conditions for this finish machining are discussed below. The low capacitance lead line 10B was used, and the switch 17 was open. When an electric discharge was produced by the application of a power pulse to the gap from the power supply 8A, power pulses from the power supply 6A were also supplied to the gap. The switching elements 6D and 8D were turned OFF after a certain ON time. After a certain OFF time, subsequent to turning the switching elements 6D and 8D OFF, the switching element 8D was again turned ON. "Straight polarity" was selected, whereby the workpiece electrode 3 was connected to the positive poles of the power supplies 6A and 8A and the tool electrode 2 was connected to the negative pole.

Other electrical discharge machining conditions were changed from (1) to (2), as shown in Table 2 below.

TABLE 2

|  | (1) | (2) |
| --- | --- | --- |
| Power Supply 6 |  |  |
| Unloaded Voltage (V) | 90 | 90 |
| ON Time ($\mu$s) | 8 | 6 |
| OFF Time ($\mu$s) | 6 | 4 |
| Peak current (A) | 3.0 | 1.1 |
| Power Supply 8 |  |  |
| Unloaded Voltage (V) | 280 | 280 |
| Peak Current (A) | 1.3 | 1.3 |
| Average Gap Voltage (V) | 70 | 70 |
| Average Gap Current (A) | 1.2 | 1.2 |

After applying the process under settings (1) for 15 minutes and under settings (2) for 15 minutes, a somewhat darkened mirror surface with favorable dimensional accuracy was obtained. The workpiece 3 surface roughness was improved to 0.7 $\mu$m Rmax.

Figure 3:
FIG. 3 is a micrograph of the surface of a workpiece machined in accordance with the present invention.

FIG. 3 is a micrograph of a machined surface. The formation of craters of uniform size is confirmed.

Next, the copper electrode was changed to a square rod-shaped graphite electrode, and machining was performed with the machining conditions, other than electrode material and shape, held virtually unchanged. As a result, a 1.2 $\mu$m Rmax polished surface was obtained.

Figure 4:
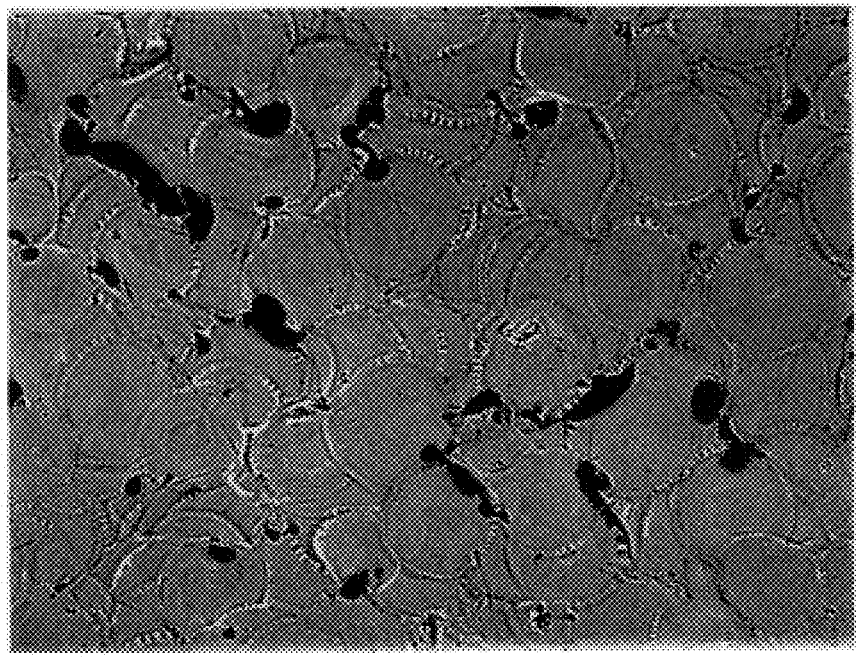
FIG. 4 is a micrograph of an undesirable workpiece surface.

Machining was also performed varying the titanium carbide powder particle size from 0.7 $\mu$m to greater than 4 $\mu$m, holding machining conditions other than particle size unchanged. The result of that machining was that perimeter edges of holes formed in the workpiece were excessively removed, and a mirror surface was not obtained. FIG. 4 is a micrograph of the machined surface. The black portions visible in that surface indicate undesirable pin holes.

The applicant assayed machining fluids in which titanium nitride having characteristics similar to titanium carbide, which has a resistivity of about 70–173 $\mu\Omega$/cm and a specific gravity of 4.9 g/cm$^3$, were blended with the dielectric fluid in various ratios, but satisfactory results were not obtained.

Furthermore, with the object of forming a mirror-finish surface on the workpiece, the applicant tried varying the material, particle size, and blending ratio with the dielectric fluid for various powders. It was found, as a result, that machining fluids to which silicide powders such as $TiSi_2$, $VSi_2$, $CrSi_2$, $ZrSi_2$, $TaSi_2$, $NbSi_2$, $MnSi_2$, $MoSi_2$, $FeSi_2$, $CoSi_2$, $WSi_2$ and $NiSi_2$ were added, contributed to the formation of a mirror-finish surface. These various silicides are obtained by, for example, the reduction of silicon dioxide using excess metal, or by the reduction of a mixture of silicon dioxide and a metal oxide with carbon at a high temperature. The silicide used in accordance with the present invention does not require a particle size as fine as titanium carbide; preferably it has a particle size of about 0.5–15 $\mu$m; more preferably, it has a particle size of about 1.5–8 $\mu$m. The powder is blended into the dielectric fluid in a ratio of about 3–50 g/l, and more preferably about 5–25 g/l. In general, silicides are hard, brittle, and easily pulverized, and have a high heat resistance and chemical resistance.

An example of machining using a silicide powder is discussed below. Machining was conducted using an electric discharge machine configured essentially as illustrated in FIG. 2. Using a 40 mm diameter rod-shaped copper electrode, machining was performed by electrical discharges on a workpiece 3, made of SKD-61 material. The machining fluid was produced by adding a powder of chrome silicide (CrSi$_2$), having an average particle size of approximately 5 μm, in a ratio of 6 g/l to a hydrocarbon oil having a viscosity of 1.885 cSt (40° C.) and ignition point of 100° C. The machining fluid was supplied to the machining gap after stirring in a reservoir tank 22.

Machining to form a mirror-finish surface was performed on the workpiece 3 after rough machining under "reverse polarity" conditions until the surface roughness reached 10 μm R max.

The electrical discharge machining conditions during the finish machining were essentially the same as the conditions for shape-forming machining using titanium carbide powder; polarity was switched from "reverse polarity" to "straight polarity" using a polarity switching device 18.

Other electrical discharge machining conditions were changed from cuts (1) to (2), as shown in Table 3 below.

TABLE 3

|  | (1) | (2) |
| --- | --- | --- |
| Power Supply 6 |  |  |
| Unloaded Voltage (V) | 90 | 90 |
| ON Time (μs) | 6 | 6 |
| OFF Time (μs) | 5 | 3 |
| Peak current (A) | 1.8 | 1.8 |
| Power Supply 8 |  |  |
| Unloaded Voltage (V) | 280 | 280 |
| Peak Current (A) | 3.5 | 2.5 |
| Average Gap Voltage (V) | 70 | 60 |
| Average Gap Current (A) | 1.8 | 1.8 |

After applying the process under settings (1) for 15 minutes and under settings (2) for 15 minutes, a mirror-finish surface with a roughness of 0.7 μm Rmax was obtained. The machined surface hardness was measured for each depth from the surface; these measurement results are shown in Table 4.

TABLE 4

| Depth from Machined Surface (μm) | Hardness (MHV) |
| --- | --- |
| 0.5 | 824.2 |
| 1.5 | 641.7 |
| 3.0 | 641.7 |
| 6.0 | 572.3 |
| 9.0 | 513.7 |
| 12.0 | 463.6 |
| 15.0 | 463.6 |
| 18.0 | 513.7 |

In most portions of the machined surface, a hardness greater than the original workpiece material hardness of 500.6 was observed.

Next a workpiece made of SKD-61 material was machined under similar conditions with respect to the chrome silicide powder and machining fluid, changing the 40 diameter round rod copper electrode to a 100 mm×100 mm square rod.

Machining to form a mirror-finish surface was performed on the workpiece 3, which had been rough machined under "reverse polarity" conditions until the surface roughness reached 15 μm R max.

Settings for the electrical machining conditions used in this finish machining are shown in Table 5 below.

TABLE 5

| Power Supply 6 |  |
| --- | --- |
| Unloaded Voltage (V) | 90 |
| ON Time (μs) | 4 |
| OFF Time (μs) | 3 |
| Peak Current (A) | 1.8 |
| Power Supply 8 |  |
| Unloaded Voltage (V) | 280 |
| Peak Current (A) | 3.5 |
| Average Gap Voltage (V) | 40 |
| Average Gap Current (A) | 2.8 |

After finish machining for 60 minutes, a mirror-finish surface having a 0.9 μm Rmax was obtained, for which the machined surface hardness measurement values were essentially the same as shown in Table 4.

The foregoing description of some preferred embodiments of the invention have been presented for purposes of illustration and description. The description is not intended to be exhaustive or to limit the invention to the precise forms disclosed, and obviously many modifications and variations are possible in light of the above teaching. The embodiments were chosen and described in order to best explain the principles of the invention and its practical application to thereby enable others skilled in the art to best utilize the invention in ears embodiments and with various modifications as are suited to the particular use contemplated. It is intended that the scope of the invention be defined by the claims appended hereto.

I claim:

1. A method for machining a workpiece by electric discharges produced in a machining gap formed between the workpiece and a tool electrode, said method comprising of:

providing an electric discharge machining fluid having titanium carbide (TiC) powder blended into a dielectric fluid, said titanium carbide powder having an average particle size in the range of from about 0.3–1.2 μm;

supplying the electric discharge machining fluid to the machining gap; and machining said workpiece using said machining fluid.

2. The electric discharge machining method according to claim 1, wherein the titanium carbide powder is blended with the dielectric fluid in a range of from about 8–50 g/l.

3. The electric discharge machining method according to claim 1, wherein the titanium carbide powder has an average particle size in the range of from about 0.5–1.0 μm.

4. The electric discharge machining method according to claim 1 wherein said electric discharges are produced by a power supply having a positive pole and a negative pole and, further comprising the steps of:

connecting the positive pole of the power supply to the workpiece;

connecting the negative pole of the power supply to the tool electrode; and applying power pulses from the power supply to the machining gap.

5. The electric discharge machining method according to claim 4, further comprising the step of providing an inductance in the range of from about 5 to several 10s of μH, and a resistance in the range of from about 20–100 Ω between said power supply and the machining gap and in proximity to the machining gap.

6. An electric discharge machining fluid comprising an oil-based dielectric fluid blended with a titanium carbide (TiC) power, said titanium carbide powder having an average particle size of in the range of from about 0.3–1.2 μm.

7. The electric discharge machining fluid according to claim 6 wherein the titanium carbide powder is present in the dielectric fluid in the range of from about 8–50 g/l.

8. The electric discharge machining fluid according to claim 6 wherein the titanium carbide powder has an average particle size in the range of from about 0.5–1.0 μm.

9. A method for electric discharge machining a workpiece by electric discharges produced in a machining gap formed between the workpiece and a tool electrode, said method comprising the steps of:

providing an electric discharge machining fluid by blending silicide powder into a dielectric fluid;

supplying the electrical discharge machining fluid to the machining gap; and machining said workpiece using said electric discharge machining fluid.

10. The method according to claim 9, further comprising the step of supplying the silicide powder to the dielectric fluid in a range of from about 3–50 g/l.

11. The method according to claim 9, further comprising the step of supplying the silicide powder to the dielectric fluid in the range of from about 5–25 g/l.

12. The method according to claim 9 wherein the silicide powder has an average particle size in the range of from about 0.5–15 μm.

13. The method according to claim 9 wherein the silicide powder has an average particle size in the range of from about 1.5–8 μm.

14. The method according to claim 9 wherein said electric discharges are produced by a power supply having a positive pole and a negative pole and, further comprising the step of connecting the positive pole to the workpiece;

connecting the negative pole to the tool electrode; and applying a power pulse from the power supply to the machining gap.

15. The method according to claim 9, wherein the silicide powder is selected from a group consisting of $TiSi_2$, $VSi_2$, $CrSi_2$, $ZrSi_2$, $TaSi_2$, $NbSi_2$, $MnSi_2$, $MoSi_2$, $FeSi_2$, $CoSi_2$, $WSi_2$, and $NiSi_2$.

16. An electric discharge machining fluid comprising an oil-based dielectric fluid blended with a silicide powder.

17. The electric discharge machining fluid according to claim 16, wherein the silicide powder is present in the dielectric fluid in a range of from about 3–50 g/l.

18. The electric discharge machining fluid according to claim 16, wherein the silicide powder is present in a range of from about 5–25 g/l.

19. The electric discharge machining fluid according to claim 16, wherein the silicide powder has an average particle size in the range of from about 0.5–15 μm.

20. The electric discharge machining fluid according to claim 16, wherein the silicide powder has an average particle size in the range of from about 1.5–8 μm.

21. The electric discharge machining fluid according to claim 16, wherein the silicide powder is selected from the group consisting of $TiSi_2$, $VSi_2$, $CrSi_2$, $ZrSi_2$, $TaSi_2$, $NbSi_2$, $MnSi_2$, $MoSi_2$, $FeSi_2$, $CoSi_2$, $WSi_2$, and $NiSi_2$.

* * * * *